United States Patent
Murai et al.

(10) Patent No.: US 9,548,674 B2
(45) Date of Patent: Jan. 17, 2017

(54) ELECTRIC POWER RECEIVING DEVICE AND METHOD OF RECEIVING ELECTRIC POWER

(75) Inventors: Toshiaki Murai, Tokyo (JP); Daisuke Shimode, Tokyo (JP); Tadashi Sawada, Tokyo (JP)

(73) Assignee: CENTRAL JAPAN RAILWAY COMPANY (JP)

( * ) Notice: Subject to any disclaimer, the term of this patent is extended or adjusted under 35 U.S.C. 154(b) by 1056 days.

(21) Appl. No.: 13/327,439

(22) Filed: Dec. 15, 2011

(65) Prior Publication Data

US 2012/0326515 A1 Dec. 27, 2012

(30) Foreign Application Priority Data

Dec. 15, 2010 (JP) ................................. 2010-279793

(51) Int. Cl.
*H02J 5/00* (2016.01)
*H02J 7/02* (2016.01)
*H02M 7/219* (2006.01)

(52) U.S. Cl.
CPC .............. *H02M 7/219* (2013.01); *H02J 5/005* (2013.01); *H02J 7/025* (2013.01); *H02J 50/12* (2016.02); *Y10T 307/658* (2015.04)

(58) Field of Classification Search
CPC .............. H02J 5/005; H02J 5/00; H02J 7/025; H02J 17/00; H02J 50/10; H02J 50/12; H02M 7/219; H02M 3/335; B60L 11/182; H04B 5/0075

(Continued)

(56) References Cited

U.S. PATENT DOCUMENTS 3,961,172 A * 6/1976 Hutcheon ...................... 708/813
5,731,698 A * 3/1998 Fujii et al. ................. 324/76.77

(Continued)

FOREIGN PATENT DOCUMENTS

JP        10108390 A      4/1998
JP        2801816 B2      9/1998

(Continued)

OTHER PUBLICATIONS

Japanese Notice of Reason(s) for Rejection for Japanese Patent Application No. 2011-274788 dated Aug. 4, 2015.

*Primary Examiner* — Levi Gannon
(74) *Attorney, Agent, or Firm* — Amster, Rothstein & Ebenstein LLP (57) ABSTRACT

An electric power receiving device according to the invention receives an electric power from a primary coil, with which a first alternating voltage is applied and through which a first alternate current flows. The device includes an electric power receiving section and a reducing-voltage generating section. The receiving section includes a secondary coil electromagnetically coupled to the primary coil and a capacitor connected to the secondary coil, and generates a second alternating voltage based upon the first alternating current. The generating section generates a reducing-voltage and applies the reducing-voltage to the receiving section, the reducing-voltage being capable of reducing a reactance voltage generated in the receiving section by a second alternating current generated in the receiving section due to the second alternating voltage, and the reducing-voltage being approximately equal to the second alternating voltage in frequency.

12 Claims, 5 Drawing Sheets

(58) Field of Classification Search
USPC ..... 307/104, 105; 363/41, 44, 21.02, 34–37, 363/98
See application file for complete search history.

(56) References Cited

U.S. PATENT DOCUMENTS

| | | | | |
|---|---|---|---|---|
| 5,801,372 | A * | 9/1998 | Yamaguchi | 235/492 |
| 5,808,462 | A * | 9/1998 | Fujii et al. | 324/76.13 |
| 5,831,841 | A * | 11/1998 | Nishino | 363/37 |
| 6,100,663 | A * | 8/2000 | Boys et al. | 320/108 |
| 6,134,130 | A * | 10/2000 | Connell et al. | 363/89 |
| 6,172,488 | B1 * | 1/2001 | Mizutani | H02J 3/1814 323/207 |
| 6,262,903 | B1 * | 7/2001 | Fujihashi et al. | 363/89 |
| 6,297,973 | B1 * | 10/2001 | Jian-Ping | H02M 5/44 363/132 |
| 6,466,126 | B2 * | 10/2002 | Collins et al. | 340/333 |
| 6,483,202 | B1 * | 11/2002 | Boys | 307/17 |
| 6,757,184 | B2 * | 6/2004 | Wei | H02M 3/1584 363/71 |
| 7,262,521 | B2 * | 8/2007 | Dooley et al. | 307/105 |
| 7,298,633 | B2 * | 11/2007 | Yasumura | H02M 3/3385 363/21.02 |
| 7,733,676 | B2 * | 6/2010 | Nunoya et al. | 363/72 |
| 8,093,758 | B2 * | 1/2012 | Hussmann et al. | 307/105 |
| 8,855,554 | B2 * | 10/2014 | Cook et al. | 455/41.1 |
| 8,860,255 | B2 * | 10/2014 | Jones et al. | 307/104 |
| 2005/0083627 | A1 * | 4/2005 | Wang et al. | 361/113 |
| 2005/0135129 | A1 * | 6/2005 | Kazutoshi | 363/98 |
| 2007/0242599 | A1 * | 10/2007 | Gorday et al. | 370/208 |
| 2008/0297107 | A1 * | 12/2008 | Kato et al. | 320/108 |
| 2009/0001932 | A1 * | 1/2009 | Kamijo et al. | 320/108 |
| 2009/0127937 | A1 * | 5/2009 | Widmer et al. | 307/149 |
| 2009/0129126 | A1 * | 5/2009 | Boys | H02J 5/005 363/37 |
| 2010/0033156 | A1 * | 2/2010 | Abe et al. | 323/305 |
| 2010/0090533 | A1 * | 4/2010 | Shimada et al. | 307/66 |
| 2010/0148723 | A1 | 6/2010 | Cook et al. | |
| 2010/0176659 | A1 * | 7/2010 | Aoyama et al. | 307/104 |
| 2010/0225173 | A1 * | 9/2010 | Aoyama | H02M 3/337 307/104 |
| 2011/0176343 | A1 * | 7/2011 | Kojima | 363/132 |
| 2011/0181231 | A1 * | 7/2011 | Ito et al. | 318/801 |
| 2011/0199061 | A1 * | 8/2011 | Shimada | 323/237 |
| 2011/0317452 | A1 * | 12/2011 | Anguelov | H02M 3/33584 363/21.02 |
| 2012/0056486 | A1 * | 3/2012 | Endo | H02J 17/00 307/104 |
| 2012/0098348 | A1 * | 4/2012 | Inoue et al. | 307/104 |
| 2012/0127765 | A1 * | 5/2012 | Maruyama | H02J 5/005 363/126 |

FOREIGN PATENT DOCUMENTS

| | | | | |
|---|---|---|---|---|
| JP | 3518197 B2 | 4/2004 | | |
| JP | 4070321 B2 | 4/2008 | | |
| JP | 2012502612 A | 1/2012 | | |
| WO | 2007029438 A1 | 3/2007 | | |
| WO | WO 2010038727 A1 * | 4/2010 | | B60W 10/08 |
| WO | WO 2010050072 A1 * | 5/2010 | | G05F 1/445 |

* cited by examiner

RELATED ART

ELECTRIC POWER RECEIVING DEVICE AND METHOD OF RECEIVING ELECTRIC POWER

CROSS-REFERENCE TO RELATED APPLICATION

This application claims the benefit of Japanese Patent Application No. 2010-279793 filed on Dec. 15, 2010 in the Japan Patent Office, the disclosure of which is incorporated herein by reference.

BACKGROUND

The present invention relates to a technique to receive electric power from a primary coil by means of a resonance circuit.

Figure 5:
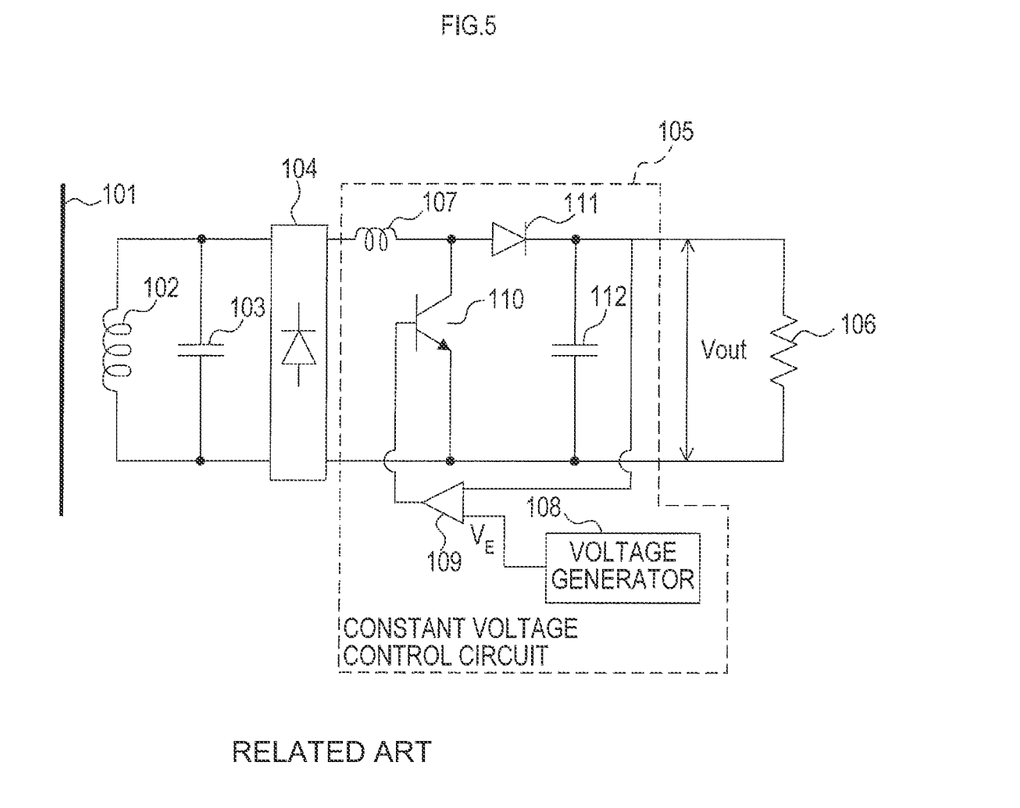
FIG. 5 is a circuit diagram illustrating a configuration of a conventional high-frequency electric power receiving circuit.

An example of a high-frequency electric power receiving circuit, which is disclosed in Japanese Unexamined Patent Application Publication No. H10-108390, will be explained with reference to FIG. 5. The high-frequency electric power receiving circuit includes a secondary coil 102, a resonance capacitor 103, a rectifier circuit 104, and a constant voltage control circuit 105. The secondary coil 102 faces a primary side induction line 101 (primary coil) that passes a high-frequency alternating current. The resonance capacitor 103 is connected in parallel to the secondary coil 102. The rectifier circuit 104 is connected to the resonance capacitor 103 and rectifies an induced voltage generated at the secondary side coil. The constant voltage control circuit 105 is connected to the rectifier circuit 104 and controls an output voltage $V_{OUT}$, so that the output voltage $V_{OUT}$ is maintained at a predetermined and constant reference voltage $V_E$.

The constant voltage control circuit 105 includes a coil 107, a voltage generator 108, a comparator 109, an output adjusting transistor 110, a diode 111, and a capacitor 112. The coil 107 is used for current limitation. The voltage generator 108 generates the reference voltage $V_E$. The comparator 109 compares the output voltage $V_{OUT}$ with the reference voltage $V_E$ of the voltage generator 108. The comparator 109 turns on the output adjusting transistor 110 when the output voltage Vout exceeds the reference voltage $V_E$. The diode 111 and the capacitor 112 form a filter. The reference voltage $V_E$ is set to the same voltage as a voltage (load voltage) to be generated between both ends of a load 106 when the load 106 is fed with electric power.

When the output voltage $V_{OUT}$ falls below the reference voltage $V_E$, the output adjusting transistor 110 is turned off and, therefore, the output voltage $V_{OUT}$ is increased. When the output voltage $V_{OUT}$ exceeds the reference voltage $V_E$, the transistor 110 is turned on by an output from the comparator 109 and, therefore, the output voltage $V_{OUT}$ is decreased. Due to such an operation of the constant voltage control circuit 105, the output voltage $V_{OUT}$ is maintained at the reference voltage $V_E$.

SUMMARY

The high-frequency electric power receiving circuit described above is ought to be fed with electric power at high efficiency from the primary coil 101. A value of inductance of the secondary coil 102 and a value of capacitance of the resonance capacitor 103 are therefore determined such that the secondary coil 102 and the resonance capacitor 103, which are connected in parallel to each other, resonate at a frequency of the alternate current flowing through the primary coil 101.

However, the value of inductance of the secondary coil 102 and the value of capacitance of the resonance capacitor 103 vary among elements, respectively. It was not thus easy to configure the high-frequency electric power receiving circuit described above such that the secondary coil 102 and the resonance capacitor 103 resonate at a frequency of the alternating current flowing through the primary coil 101.

Also, the value of inductance of the secondary coil 102 changes due to its temperature or aged deterioration. In this case, since a resonant frequency is shifted to another frequency due to this change, an adjusting work was necessary to maintain a frequency of the alternating current flowing through the primary coil as a resonant frequency.

According to one aspect of the present invention, it is preferable to provide an electric power receiving device in which resonance can be generated at a frequency of an alternate current flowing through a primary coil more easily than ever before.

An electric power receiving device in a first aspect of the present invention is an electric power receiving device that receives an electric power from a primary coil to which a first alternating voltage is applied and through which the first alternating current flows. The electric power receiving device includes an electric power receiving section and a reducing-voltage generating section. The electric power receiving section includes a secondary coil electromagnetically-coupled to the primary coil and a capacitor connected to the secondary coil, and generates a second alternating voltage based upon the first alternating current. The reducing-voltage generating section generates a reducing-voltage and applies the generated reducing-voltage to the electric power receiving section, the reducing voltage being capable of reducing a reactance voltage generated in the electric power receiving section by a second alternating current generated in the electric power receiving section due to the second alternating voltage, and the reducing-voltage being approximately equal to the second alternating voltage in frequency.

In the electric power receiving device configured described above, it is possible to inhibit a reactance voltage in the electric power receiving section from interfering resonance generation in the electric power receiving section by applying the aforementioned reducing-voltage to the electric power receiving section. Therefore, resonance can be generated at the electric power receiving section at a frequency of the second alternating voltage without adjusting an inductance of the secondary coil and/or capacitance of the capacitor in the electric power receiving section. That is, in this electric power receiving device, it is easier than ever before to generate resonance at a frequency of the first alternating current flowing through the primary coil. The frequency of the reducing-voltage may be completely equal to a frequency of the second alternating voltage, or may contain an error acceptable to consider the frequency of the reducing-voltage being identical to the frequency of the second alternating voltage.

The reducing-voltage generating section may be configured in any way to generate the reducing-voltage. For example, the reducing-voltage generating section may include an amplitude phase detecting section and a parameter calculating section. The reducing-voltage generating section may be configured to generate the reducing-voltage based upon a plurality of parameters calculated by the parameter calculating section. The amplitude phase detecting section detects an amplitude and a phase of the second alternating current. The parameter calculating section calculates the plurality of parameters to determine the reducing-voltage based upon the amplitude and the phase of the second alternating current detected by the amplitude phase detecting section and a preset impedance of the electric power receiving section. If the reducing-voltage generating section is configured in this way, the above-described reducing-voltage can be generated.

The reducing-voltage may be a voltage in any wave form and may be a square wave form voltage, for example. In this ease, the reducing-voltage may be any square wave form voltage and may be a pulse-shaped alternating voltage, for example. The reducing-voltage generating section may generate this type of pulse-shaped alternating voltage in any way. For example, the reducing-voltage generating section may be configured to generate alternately a positive pulse and a negative pulse, by means of a direct current voltage, the positive pulse and the negative pulse forming the reducing-voltage. In the reducing-voltage generating section configured described above, the reducing voltage can be generated by use of direct current voltage. In this case, the reducing-voltage generating section may include a pulse controlling section to generate the positive pulse and the negative pulse alternately based upon the plurality of parameters calculated by the parameter calculating section, for example.

The amplitude phase detecting section may be configured in any way. For example, the amplitude phase detecting section may include a first multiplier, a second multiplier, a first filter section, a second filter section, a first analog-digital converting section, a second analog-digital converting section, and a current phase amplitude calculation section. The first multiplier generates a first signal obtained by multiplying the second alternating current by a reference signal having a frequency equal to a frequency of the second alternating current. The second multiplier generates a second signal obtained by multiplying the second alternating current by an alternating current signal having a frequency equal to the frequency of the second alternating current and having a phase shifted by 90 degrees from a phase of the reference signal. The first filter section outputs a first segregated signal obtained by removing a frequency component contained in the first signal higher than a frequency of the second alternating current. The second filer section outputs a second segregated signal obtained by removing a frequency component contained in the second signal higher than the frequency of the second alternating current. The first analog-digital converting section receives the first segregated signal and converts the first segregated signal into a first digital signal at a predetermined sampling cycle. The second analog digital converting section receives the second segregated signal and converts the second segregated signal into a second digital signal in a predetermined sampling cycle. The current phase amplitude calculation section calculates the amplitude and the phase of the second alternating current based upon the first and second digital signals. The amplitude phase detecting section configured described above is suitable for the reducing-voltage generating section to generate the positive pulse and the negative pulse, which forms the reducing-voltage, alternately by use of direct current.

The plurality of parameters calculated by the parameter calculating section may include any parameters to determine the reducing-voltage. For example, the plurality of parameters calculated by the parameter calculating section may include an amplitude E of the reducing-voltage, a phase $\Phi$ to the reference signal of the reducing-voltage, an impedance amplitude Z of the electric power receiving section, and an impedance phase $\phi$ of the electric power receiving section. In this case, the parameter calculating section may be configured to calculate the plurality of parameters based upon following mathematical formulas (1), (2), (3), and (4), $$E = ZI \qquad (1),$$

$$\Phi = \phi + \theta \qquad (2),$$

$$Z = (R_c^2 + (X_c)^2)^{1/2} \qquad (3), \text{ and}$$

$$\phi = \arctan(R_c/X_c) \qquad (4).$$

Here, I represents an amplitude of the second alternating current, $\theta$ represents a phase of the second alternating current, $R_c$ represents a value equal to or greater than a resistance component, in the electric power receiving section, $X_c$ represents a synthetic reactance of an inductive reactance of the secondary coil and a capacitive reactance of the capacitor.

When the parameter calculating section is configured described above, the reducing-voltage is determined based upon a value equal to or greater than a resistance component, an inductive reactance of the secondary coil, and a capacitive reactance of the capacitor. Therefore, the reducing-voltage generating section can generate the reducing-voltage capable of reducing a reactance voltage corresponding to the inductive reactance and the capacitive reactance, thereby enabling to inhibit a reactance voltage in the electric power receiving section from interfering resonance generation in the electric power receiving section.

The pulse controlling section may be configured in any way to generate the positive pulse and the negative pulse alternately based upon the plurality of parameters calculated by the parameter calculating section.

The pulse controlling section may be configured, for example, to calculate a pulse width $\theta a$ of the positive pulse and the negative pulse with a following mathematical formula (5), calculate an interval $\beta$ between the positive pulse and the negative pulse with a following mathematical formula (6), and calculate an initial angle $\alpha$, at which the positive pulse is first generated, with a following mathematical formula (7), and generate the positive pulse ad the negative pulse alternately based upon the pulse width $\theta a$, the initial angle $\alpha$, and the interval $\beta$.

$$\theta a = 2 \arcsin(E\pi/4Ed) \qquad (5)$$

$$\beta = \pi - \theta a \qquad (6)$$

$$\alpha = -\Phi + \beta/2 \qquad (7)$$

Ed is a value of the direct current voltage. With the pulse controlling section configured described above, the positive pulse and the negative pulse, which forms the above-described reducing-voltage, can be generated alternately.

A capacitance of the capacitor may be set in a manner that a resonant frequency with the secondary coil is smaller than a frequency of the second alternating current.

In this case, the second alternating current flowing through the secondary coil lags in phase with respect to the reducing-voltage ($0 < \theta < \pi$), thus enabling to suppress a surge voltage (overshoot) from generating when the reducing-voltage is raised. Therefore, it is possible to inhibit generation of a large switching loss at a switching element generating a positive pulse and a negative pulse.

The electric power receiving device may include a voltage converting section converting the second alternating voltage to a direct current voltage. With the electric power receiving device configured described above, it is possible to generate a direct current voltage by use of electric power received from the primary coil.

A method in a second aspect of the present invention is a method of receiving an electric power from a primary coil to which a first alternating voltage is applied and through which a first alternating current flows. The method includes an alternating voltage generating step, a reducing-voltage generating step, and a reducing-voltage applying step. In the alternating voltage generating step, a second alternating voltage based upon the first alternating current is generated in an electric power receiving section that has a secondary coil electromagnetically-coupled to the primary coil and a capacitor connected to the secondary coil. In the reducing-voltage generating step, a reducing-voltage is generated, which is capable of reducing a reactance voltage generated in the electric power receiving section by a second alternating current generated at the electric power receiving section due to the second alternating voltage and is approximately equal to the second alternating voltage in frequency. In the reducing-voltage applying step, the reducing-voltage is applied to the electric power receiving section.

According to the above-described electric power receiving method, it is possible to inhibit a reactance voltage generated by the secondary coil and the capacitor from interfering resonance generation, by applying the aforementioned reducing-voltage to the electric power receiving section. Therefore, resonance can be generated at a frequency of the second alternating voltage without adjusting an inductance of the secondary coil and/or capacitance of the capacitor.

BRIEF DESCRIPTION OF THE DRAWINGS

Hereinafter, the invention will be described by way of example with reference to the accompanying drawings in which.

MODE FOR CARRYING OUT THE INVENTION

[Overview of an Electric Power Receiving Device]

Figure 1:
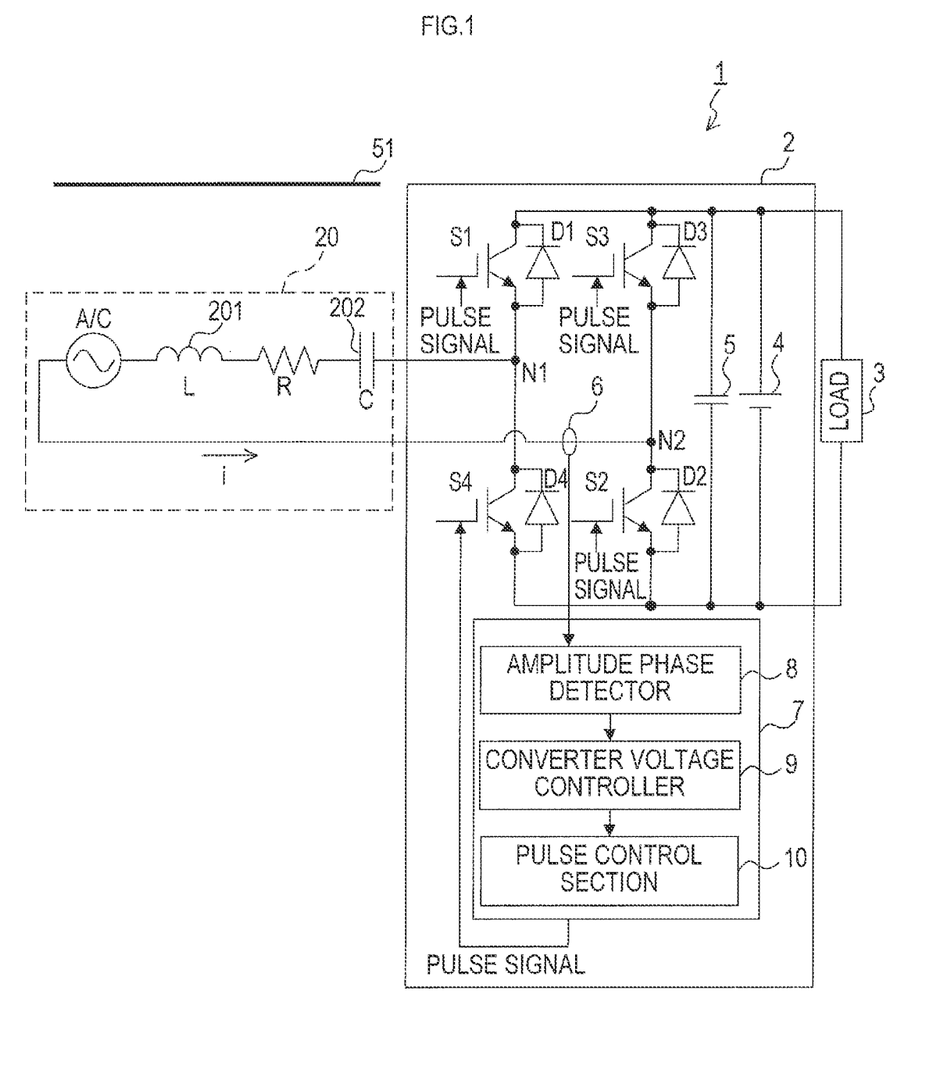
FIG. 1 is a circuit diagram showing an electrical configuration of an electric power receiving device of an embodiment to which the present invention is applied.

As illustrated in FIG. 1, an electric power receiving device 1 includes an electric power receiving section 20 and a square wave converter 2. The electric power receiving section 20 includes a secondary coil 201 and a resonance capacitor 202. The secondary coil 201 is located facing a primary coil 51 arranged outside the electric power receiving device 1 and electromagnetically coupled to the primary coil 51. An inductive reactance voltage ($\omega Li$: $\omega$ is an angular frequency, L is an inductance of the secondary coil 201, and i is an instantaneous value of an alternating current flowing through the secondary coil 201) of the secondary coil 201 is compensated by a capacitive reactance voltage ($i/\omega C$: C stands for capacitance) generated by the resonance capacitor 202. The secondary coil 201 and the resonance capacitor 202 configure a serial resonance circuit with one end of each thereof being connected. A/C in the diagram of FIG. 1 denotes an induced voltage $e_0$ generated at the secondary coil 201, and a resistance R illustrated between the secondary coil 201 and the resonance capacitor 202 denotes a resistance component included in the secondary coil 201.

The square wave converter 2 includes a first to a fourth switch sections S1-S4, a first to a fourth diodes D1-D4, a direct current power source 4, a smoothing capacitor 5, a current sensor 6, and a control section 7.

Each of the switch sections S1.34 is a switch element having a self arc-extinguishing function. According to the embodiment, an insulated gate bipolar transistor (IGBT) is for example employed for each of the switch sections S1-S4. However, other switch elements, such as a MOSFET, may be employed.

More specifically, an emitter of the switch section S1 and a collector of the switch section S4 are connected to each other, and an emitter of the switch section S3 and a collector of the switch section S2 are connected to each other. A set of the switch sections S1 and S4, which are connected in series as described above, and the other set of the switch sections S3 and S2 as described above, which are also connected in series, are connected in parallel between both ends of a load 3.

The other end of the resonance capacitor 202 of the electric power receiving section 20 is connected to a node N1 between the emitter of the switch section S1 and the collector of the switch section S4. The other end of the secondary coil 201 of the electric power receiving section 20 is connected to a node N2 between the emitter of the switch section S3 and the collector of the switch section S2.

Each of the first to fourth diodes D1-D4 is connected between the collector and emitter of each of the first to fourth switch sections S1-S4 and absorbs a back electromotive force generated when each of the switch sections S1-S4 is shifted from an on state to an off state. The diodes D1-D4 may be discrete elements or parasitic diodes formed between the emitters and the collectors of the switch sections S1-S4.

The direct current power source 4 and the smoothing capacitor 5 are connected in parallel to the load 3. The smoothing capacitor 5 smoothes a direct current that was converted from the alternating current by the switch sections S1-S4 and contains a pulsating current.

According to the embodiment, the current sensor 6 is a non-contact type current sensor. The noncontact type current sensor includes a current transformer constituted by winding coils on an insulated ring core, and detects an instantaneous value of an alternating current by applying an alternating current, which flows through an electric wire penetrating the ring core, to a load resistor within the current sensor 6. In the ring core of the current sensor 6, the electric wire, which reaches the node N2 from the other end of the secondary coil 201 of the electric power receiving section 20, is penetrating through the ring core. The current sensor 6 detects an instantaneous value i of an alternating current flowing through this electric wire.

The control section 7 includes an amplitude phase detector 8, a converter voltage controller 9, and a pulse control section 10. The amplitude phase detector 8 is connected to the current sensor 6. The converter voltage controller 9 is connected to the amplitude phase detector 8. The pulse control section 10 is connected to the converter voltage controller 9 and each of gates in the switch sections S1-S4.

As described later, the control section 7 performs switching of the switch sections S1-S4 in such a manner as to alternate turning on/off between a first pair consisted of the switch sections S1 and S2 and a second pair consisted of the switch sections 23 and S4. The square wave converter 2 converts an alternating current from the electric power receiving section 20 to a direct current with the aforementioned switching operation. The square wave converter 2 further generates a converter voltage (cancel voltage) that cancels a reactance voltage attributed by a reactance (a combined reactance of the inductive reactance and the capacitive reactance) in the electric power receiving section 20 so as to inhibit the reactance voltage from interfering resonance generation at the electric power receiving section 20.

Figure 2:
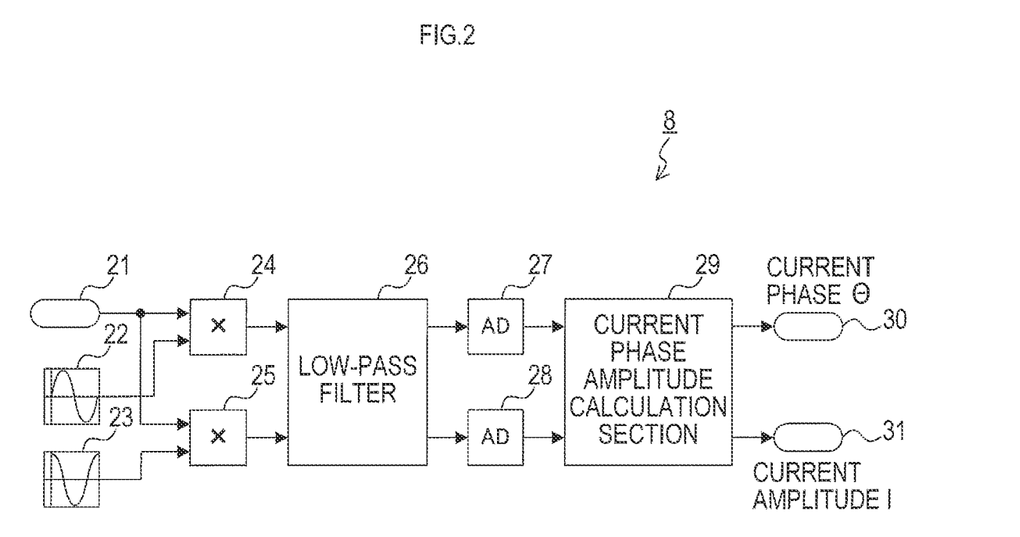
FIG. 2 is a block diagram illustrating a configuration of an amplitude phase detecting section according to the embodiment.

As shown in FIG. 2, the amplitude phase detector 8 includes an input terminal 21, a first transmitter 22, a second transmitter 23, multipliers 24 and 25, a low-pass filter 26, AD converters 27 and 28, and a current phase amplitude calculation section 29.

The instantaneous value i of the alternating current detected by the current sensor 6 is inputted to the input terminal 21. The first transmitter 22 generates a reference alternating current signal (hereinafter referred to as "reference signal": e.g., sin wave signal) as a first reference signal. The second transmitter 23 generates a signal (e.g., cos wave signal) having a phase shifted from that of the reference signal by 90 degrees as a second reference signal. The multipliers 24 and 25 multiply the instantaneous value i of the alternating current by the generated sin wave signal and the generated cos wave signal, respectively, and output a first signal and a second signal. The low-pass filter 26 removes frequency components (harmonic component), which are higher than a frequency of an alternating current, contained in the first signal and the second signal. The AD converters 27 and 28 AD-converts (converts from analog to digital form) a pair of analog signals outputted from the low-pass filter 26 respectively to output a corresponding pair of digital signals. The current phase amplitude calculation section 29 performs arithmetic processing of each of the pair of digital signals outputted from the AD converters 27 and 28. For example, the current phase amplitude calculation section 29 calculates a current phase θ by performing an arctangent (Arctan) calculation and also calculates a current amplitude I by calculating a square-root of sum of squares of each of the digital signals outputted from the AD converters 27 and 28.

Hereafter, a description will be given of an operation of the electric power receiving device 1 with reference to FIGS. 1, 2, 3A, and 3B.

When high-frequency alternating current flows through the primary coil 51 by a high frequency alternating voltage (e.g., 5-30 kHz) applied thereto, an induced voltage Co is generated at the secondary coil 201. Thereby an alternating current flows through the electric power receiving section 20. An instantaneous value i of the alternating current is detected by the current sensor 6, and the instantaneous value i of the alternating current detected is transmitted to the amplitude phase detector 8.

The alternating current instantaneous value i detected by the current sensor 6 is as shown in the following mathematical formula (1):

$$i = I \exp[j(\omega t + \theta)] \quad (1)$$

Here, I represents the current amplitude, t represents time, θ represents the current phase, and exp is an abbreviation for exponential (exponential function). The amplitude phase detector 8 calculates the current amplitude I and the current phase θ of the instantaneous value i of the alternating current that is generated at the electric power receiving section 20. The current amplitude I and the current phase θ are parameters to be required to calculate a voltage amplitude E of a converter voltage $e_c$ described later.

[Operation of the Amplitude Phase Detector 8]

The first signal outputted from the first multiplier 24 is expressed as I cos(ωt+θ)sin(ωt). The second signal outputted from the second multiplier 25 is expressed as I cos(ωt+θ)cos(ωt).

Although the instantaneous value i of the alternating current is given by i=Iexp[j(ωt+φ+θ)] from the above mathematical formula (1), Iexp[j(ωt+φ+θ)] can be expressed as I cos(ωt+θ) by applying Euler's formula. Here, I cos(ωt+θ) sin(ωt) can be expressed as I{−sin θ+sin(2ωt+θ)} by applying the product-to-sum formula of a trigonometric function: cos α sin β={sin(α+β) −sin(α−β)}/2. Likewise, I cos(ωt+θ)cos(ωt) can be expressed as I{cos θ+cos(2ωt+θ) by applying the product-to-sum formula: cos α cos β=<cos(α+β)+cos(α−β)}/2).

Next, the low-pass filter 26 removes the harmonic component of the first signal from the first multiplier 24 to output a first segregated signal. In addition, the low-pass filter 26 removes the harmonic component of the second signal from the second multiplier 25 to output a second segregated signal.

Specifically, as for the first signal, I sin(2ωt+θ), which is a harmonic component of I{−sin θ+sin(2ωt+θ)}, is removed and only I{−sin θ}, which is a stationary outputted as the first segregated signal.

As for the second signal, I cos(2ωt+θ), which is a harmonic component of I{cos θ+cos(2ωt+θ)}, is removed and only I cos θ, which is a stationary component (direct current component), is extracted to be outputted as the second segregated signal.

Next, the AD converters 27 and 28 convert the first segregated signal and the second segregated signal, which are a pair of analog signals from the low-pass filter 26, into a first digital signal and a second digital signal at predetermined sampling frequencies, respectively.

The current phase amplitude calculation section 29 calculates the current phase θ by a mathematical formula (2) below, i.e., by performing an arctangent (Arctan) calculation, based on the first digital signal (I sin θ/2) and the second digital signal (I cos θ/2).

$$\theta = \arctan\{(I \sin \theta/2)/I \cos \theta/2)\} \quad (2)$$

Furthermore, the current phase amplitude calculation section 29 computes the square root of a sum of a square of the first digital signal and a square of the second digital signal (see a mathematical formula (3) below) to calculate the current amplitude I.

$$I = 2\{(I \sin \theta/2)^2 + (\cos \theta/2)^2\}^{1/2} \quad (3)$$

Although the above operation has been described using a trigonometric function, using two rectangular signals can obtain the same effects, each of which has a frequency equal to a voltage of a power supply connected to the primary coil and is shifted in phase by 90 degrees from each other.

Even when there are no signals having phases shifted 90 degrees from each other, the current phase θ can be calculated by implementing an arcsine calculation after separately detecting only a current amplitude using a dedicated current amplitude sensor, converting to a digital signal, dividing a value of the digital signal by the current amplitude obtained by the aforementioned sensor, and doubling the divided product.

[Operation of the Converter Voltage Controller 9]

The converter voltage controller 9 calculates a converter voltage $e_c$ to be applied to an input side of the square wave converter 2. Here, the converter voltage $e_c$ is a voltage to be applied between input terminals (between the node N1 and the node N2) of the square wave converter 2.

More specifically, the converter voltage controller 9 is necessary to generate the converter voltage $e_c$, which works to inhibit a reactance voltage in the electric power receiving section 20 from interfering resonance generation in the electric power receiving section 20, at the input terminals of the square wave converter 2 and achieve resonance in the electric power receiving section 20.

Detailed description will be given with regard to a method of calculating the converter voltage $e_c$. The input voltage $e_{in}$ is first calculated in accordance with the following mathematical formula (4):

$$e_{in} = Z\exp(j\phi) \cdot I\exp(j\omega t + j\theta) = ZI\exp[j(\omega t + \phi + \theta)] \quad (4)$$

Here, Z represents an equivalent impedance amplitude (hereinafter, referred to as an impedance amplitude) in the electric power receiving section 20. $\phi$ represents an equivalent impedance phase (hereinafter, referred to as an impedance phase) in the electric power receiving section 20. The current phase $\theta$ and the current amplitude I are calculated with the above-described mathematical formulas (2) and (3), respectively. The impedance amplitude Z is calculated with a mathematical formula (5) below, and the impedance phase $\phi$ is calculated with a mathematical formula (6) below.

$$Z = (R_c^2 + (X_c)^2)^{1/2} \quad (5)$$

$$\phi = \arctan(R_c/X_c) \quad (6)$$

$R_c$ is a value equal to or greater than the resistance R described above, and $X_c$ is a combined reactance ($\omega L - 1/\omega C$) of the inductive reactance ($\omega L$) of the secondary coil 201 and the capacitive reactance ($1/\omega C$) of the resonance capacitor 202.

The voltage amplitude E of the converter voltage $e_c$ and a phase $\Phi$ with respect to the reference signal are calculated with the following mathematical formulas (7) and (8).

$$E = ZI \quad (7)$$

$$\Phi + \phi + \theta \quad (8)$$

Accordingly, when the secondary coil L side is seen from between the input terminals (the nodes N1-N2) of the square wave converter 2, the reactance voltage attributed by the reactance (the combined reactance of the inductive reactance and the capacitive reactance) from the electric power receiving section 20 to the node N1 and node N2 can be null by generating the converter voltage $e_c$ calculated based on the above mathematical formulas (4) to (8), having an amplitude and a phase approximately identical to these of an amplitude and a phase of the input voltage $e_{in}$, and being approximately equivalent to the input voltage $e_{in}$ (the reactance in the electric power receiving section 20 can be cancelled). As a result, the reactance voltage of the electric power receiving section 20 can be inhibited from interfering resonance generation, thus achieving resonance generation in the electric power receiving section 20.

[Operation of the Pulse Control Section 10]

The pulse control section 10 generates pulse signals and outputs the pulse signals to each of the gates of the switching sections S1-S4 so as to perform a switching operation for the switch sections S1-S4 in such a manner that the converter voltage $e_c$, which is determined by the converter voltage controller 9 and is approximately equivalent to the input voltage $e_{in}$, is generated between the nodes N1 and N2.

Figure 3A:
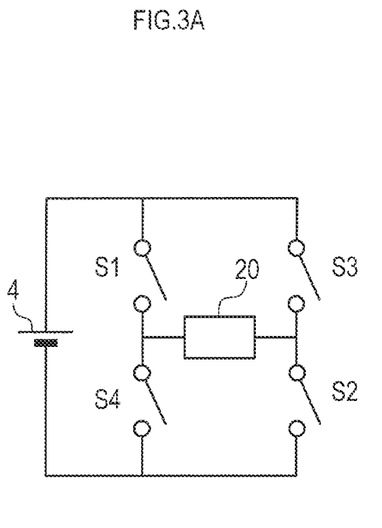
FIG. 3A is a general equivalent circuit schematic of a circuit formed with an electric power receiving section, a first to a fourth switch sections, and a direct current power source.

Hereinafter, a description will be given of how switching of each of the switch sections S1-S4 is performed with reference to FIGS. 3A and 3B.

In the pulse control section 10, an overlap angle $\beta$ is first calculated with a mathematical formula (9) below.

$$\beta = \pi - \theta a \quad (9)$$

$\theta a$ represents an on-time (duty) of one pulse of the converter voltage $e_c$ (see FIG. 3B) and can be obtained by calculation with a mathematical formula (10) below based on the voltage amplitude E of the converter voltage $e_c$ calculated by the converter voltage controller 9, a voltage Ed of the direct current source separately detected, etc.

$$\theta a = 2 \arcsin(E\pi/4Ed) \quad (10)$$

Further, an initial phase $\alpha$, which is necessary for synchronization with the reference signal generated in the first transmitter 22, is calculated with the following mathematical formula (11).

$$\alpha = -\Phi + \beta/2 \quad (11)$$

Next, a description will be given of the timing of turning on/off the switch sections S1-S4 with reference to FIGS. 3A and 3B. The timing chart indicated in FIG. 3B shows, from top down, pulse waves outputted to the switch sections S1-S4, and a voltage pulse of the converter voltage $e_c$ is shown at the lowermost of FIG. 3B.

(i) Switching of the Switch Sections S1 and S3

Firstly, the switch section S1 is switched in such a way that the switch section S1 is turned on for a predetermined time period (approximately $\pi$ per period) with a phase shifted by the initial phase $\alpha$ and is then turned off for the same predetermined time period as the on-time period. Subsequently, the aforementioned operation is performed repetitively.

Next, the switch device S3 is turned on with timing such that an overlapping section between the on-time periods of the switch sections S1 and S3 is an angle $\beta$; and then maintained being turned on or the same time period as the on-time period of the switch section S1. The switch section S3 is then switched to be turned off for the same time period as the off-time period of the switch section S1. Subsequently, the aforementioned operation is performed repetitively.

Due to the above switching operation, a positive pulse of the converter voltage $e_c$ is generated concurrently with the turn-on of the switch section S1 and then disappears after a lapse of a certain period of time ($\pi - \beta$).

(ii) Switching of the Switch Sections S2 and S4

The switch section S2 is switched in such a way that the switch section S2 is turned on for the same time period as the on-time period of the switch section S1 and is then turned off for the same time period as the off-time period of the switch device S1 so as not to overlap the on-time period of the switch section S3. Subsequently, the aforementioned operation is performed repetitively.

Next, the switch section S4 is turned on with timing such that an overlapping section between the on-time periods of the switch sections S2 and S4 is the angle $\beta$; and then maintained being turned on for the same time period as the on-time period of the switch section S2. The switch section S4 is then switched to be turned off for the same time period as the off-time period of the switch section S2. Subsequently, the aforementioned operation is performed repetitively. In other words, the switch section S4 is switched so as to be turned off for the same time period as the on-time period of the switch section S1 and then to be turned on for the same time period as the off-time period of the switch section S1, thereby not to overlap the on-time period of the switch section S1. Subsequently, the aforementioned operation is performed repetitively.

Due to the above switching operation, a negative pulse of the converter voltage $e_c$ is generated concurrently with the turn-on of the switch section S4 and then disappears after a lapse of a certain period of time $(\pi-\beta)$.

Figure 3B:
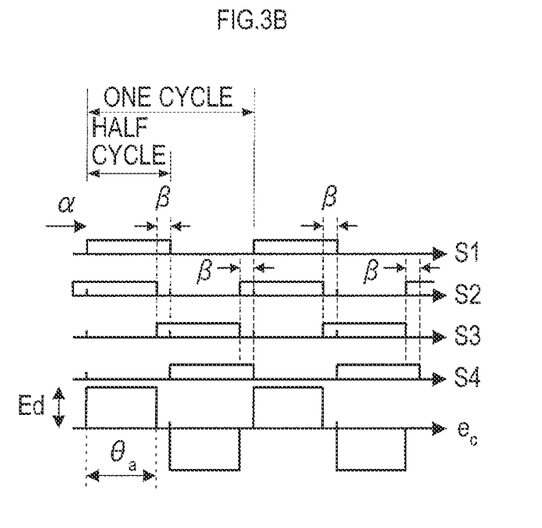
FIG. 3B is a timing chart of a switching operation of the first to fourth switch sections.

By the above-described switching operation of the switch sections S1-S4, the voltage pulse of the converter voltage $e_c$ as shown in the lowermost of FIG. 3B is generated, so that the converter voltage $e_c$ can be generated between the nodes N1-N2.

Figure 4A:
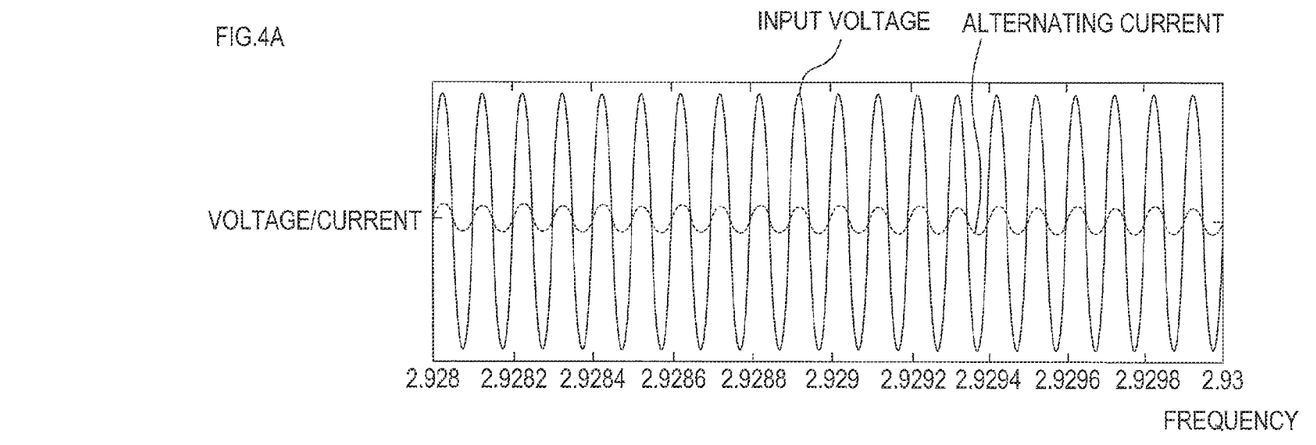
FIG. 4A illustrates waveforms of an input voltage and an alternate current inputted to a square wave converter from the electric power receiving section.
Figure 4B:
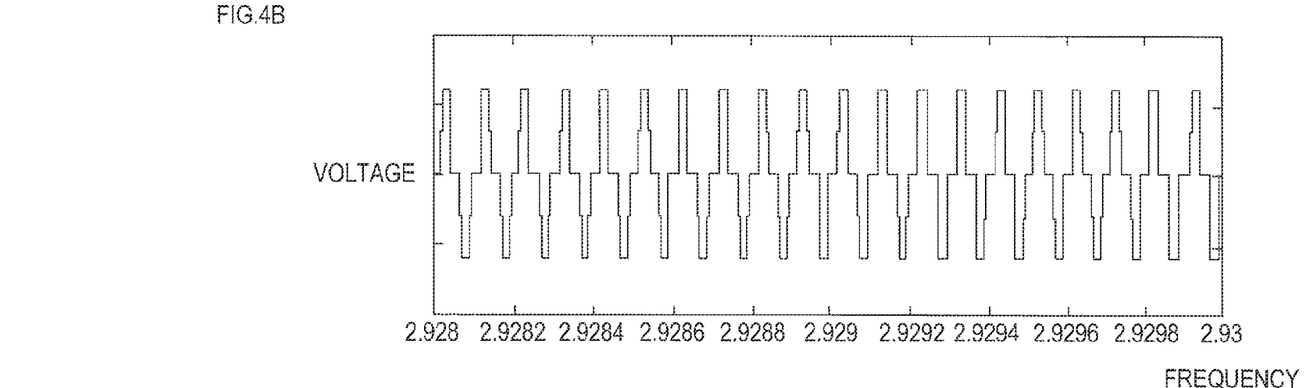
FIG. 4B illustrates waveforms of a converter voltage generated at the square wave converter.

As is clear from the input voltage and the waveform of the alternating current in the electric power receiving section 20 shown in FIG. 4A, it can be seen that the input voltage and the alternating current coincide with each other in phase and are in a resonant condition. Further, it also can be seen that the alternating current includes little distortion and harmonics. This type of alternating current is converted to a direct current containing a pulsating current by the switching operation of the switch devices S1-S4 and then converted to a direct current smoothed by the smoothing capacitor 5.

As described above, in the electric power receiving device 1 according to the embodiment, resonance can be generated, in the electric power receiving section 20, at a frequency of the alternating current without adjusting the inductance of the secondary coil 201 and/or the capacitance of the capacitor 202 in the electric power receiving section 20. That is, in the electric power receiving device 1, resonance can be generated at a frequency of a first alternating current flowing through the primary coil 51 more easily than a conventional work ever before.

Further, in the electric power receiving device 1 of the embodiment, resonance can be achieved by use of the square wave converter 2 having a simple configuration with semiconductor switches and without a chopper circuit including a heavy coil, thus enabling to reduce the weight and the cost of the electric power receiving circuit.

The capacitance of the resonance capacitor 202 needs to be set such that a resonant frequency fr ($1/2\pi\sqrt{(LC)}$) with the secondary coil 201 is equal to or lower than a frequency (switching frequency) fs of the alternating current flowing through the secondary coil 201 ($2\pi fsL > 1/2\pi fsC$).

The reason is that, if the resonant frequency fr exceeds the switching frequency fs ($2\pi fsb < 1/2\pi fsC$), the alternating current flowing through the secondary coil 201 advances in phase with respect to the converter voltage $e_c$ ($\pi < \theta < 2\pi$), which increases a potential for generating a surge voltage (overshoot) when the voltage pulse of the converter voltage $e_c$ is raised and leads to cause a great switching loss.

In the present embodiment, the secondary coil 201 corresponds to an example of a secondary coil of the present invention; the resonance capacitor 202 corresponds to an example of a capacitor of the present invention; and the electric power receiving section 20 corresponds to an example of an electric power receiving section of the present invention. Further, in the embodiment, the square wave converter 2 corresponds to an example of a reducing-voltage generating section and an example of a voltage converting section of the present invention. Still further, in the embodiment, the amplitude phase detector 8 corresponds to an example of an amplitude phase detecting section of the present invention; the converter voltage controller 9 corresponds to an example of a parameter calculating section of the present invention; and the pulse control section 10 corresponds to an example of a pulse controlling section of the present invention. Another still further, in the embodiment, the multipliers 24 and 25 respectively correspond to an example of a first multiplier and an example of a second multiplier of the present invention, the low-pass filter 26 corresponds to an example of a first filter section and an example of a second filter section of the present invention, the AD converters 27 and 28 respectively correspond to an example of a first analog-digital converting section and an example of a second analog-digital converting section of the present invention, and the current phase amplitude calculation section 29 corresponds to an example of a current phase amplitude calculation section of the present invention.

Although a description has been made as to one embodiment of the present invention, the present invention is not limited to the above embodiment and can take various forms without departing from the gist of the present invention.

For example, in the above embodiment, the electric power receiving device 1 is configured to receive electric power from the primary coil 51 by means of the series resonance circuit. However, the electric power receiving device 1 may be configured to receive electric power from the primary coil 51 by means of a parallel resonance circuit. Further, in the above embodiment, the primary coil 51 is fed with high-frequency current. However, the primary coil 51 may be fed with electric current which is lower than the high-frequency current in frequency. Still further, in the above embodiment, the converter voltage $e_c$ is a voltage to cancel the reactance voltage. However, the converter voltage $e_c$ may be a voltage to reduce the reactance voltage.

The invention claimed is:

1. An electric power receiving device that receives an electric power from a primary coil with which a first alternating voltage is applied and through which a first alternating current flows, the electric power receiving device comprising:
    a series resonance circuit that comprises a secondary coil electromagnetically-coupled to the primary coil and a capacitor connected to the secondary coil in series and generates a second alternating voltage based upon the first alternating current; and
    a reducing-voltage generating section that generates a reducing-voltage and applies the reducing voltage to the series resonance circuit, the reducing-voltage being capable of reducing a reactance voltage generated in the series resonance circuit by a second alternating current generated in the series resonance circuit, due to the second alternating voltage, and the reducing-voltage being equal to the second alternating voltage in frequency.

2. The electric power receiving device according to claim 1, wherein the reducing-voltage generating section comprises:
    an amplitude phase detecting section that detects an amplitude and a phase of the second alternating current; and
    a parameter calculating section that calculates a plurality of parameters to determine the reducing-voltage based upon the amplitude and the phase of the second alternating current detected by the amplitude phase detecting section and a predetermined impedance of the series resonance circuit,
wherein the reducing-voltage generating section is configured to generate the reducing-voltage based upon the plurality of parameters calculated by the parameter calculating section.

3. The electric power receiving device according to claim 2, wherein the reducing-voltage is a square wave voltage.

4. The electric power receiving device according to claim 3, wherein the reducing-voltage is a pulse-shaped alternating voltage.

5. The electric power receiving device according to claim 4, wherein the reducing-voltage generating section is configured to generate alternately a positive pulse and a negative pulse by means of a direct current voltage, the positive pulse and the negative pulse forming the reducing-voltage.

6. The electric power receiving device according to claim 5, wherein the reducing-voltage generating section further comprises a pulse controlling section that generates the positive pulse and the negative pulse alternately based upon the plurality of parameters calculated by the parameter calculating section.

7. The electric power receiving device according to claim 6, wherein the amplitude phase detecting section comprises:
a first multiplier that generates a first signal obtained by multiplying the second alternating current by a reference signal having a frequency equal to a frequency of the second alternating current;
a second multiplier that generates a second signal obtained by multiplying the second alternating current by an alternating current signal having a frequency equal to the frequency of the second alternating current and being shifted by 90 degrees from the reference signal in phase;
a first filter section that outputs a first segregated signal obtained by removing a frequency component contained in the first signal higher than a frequency of the second alternating current;
a second filter section that outputs a second segregated signal obtained by removing a frequency component contained in the second signal higher than the frequency of the second alternating current;
a first analog-digital converting section that receives the first segregated signal and converts the first segregated signal into a first digital signal in a predetermined sampling cycle;
a second analog-digital converting section that receives the second segregated signal and converts the second segregated signal into a second digital signal in a predetermined sampling cycle; and
a current phase amplitude calculation section that calculates the amplitude and the phase of the second alternating current based upon the first and second digital signals.

8. The electric power receiving device according to claim 7, wherein the plurality of parameters calculated by the parameter calculating section includes an amplitude E of the reducing-voltage, a phase Φ of the reducing-voltage relative to the reference signal, an impedance amplitude Z of the series resonance circuit, and an impedance phase φ of the series resonance circuit, and the parameter calculating section is configured to calculate the plurality of parameters based upon following mathematical formulas (1) to (4), $$E = ZI \quad (1)$$

$$\Phi = \phi + \theta \quad (2)$$

$$Z = (R_c^2 + (X_c)^2)^{1/2} \quad (3)$$

$$\phi = \arctan(R_c/X_c) \quad (4)$$

where I represents the amplitude of the second alternating current, θ represents the phase of the second alternating current, $R_c$ represents a value equal to or greater than a resistance component in the series resonance circuit, $X_c$ represents a combined reactance of an inductive reactance of the secondary coil and a capacitive reactance of the capacitor.

9. The electric power receiving device according to claim 8, wherein the pulse controlling section is configured to:
calculate a pulse width θa of the positive pulse and the negative pulse based on a following mathematical formula (5);
calculate an interval β between the positive pulse and the negative pulse based on a following mathematical formula (6);
calculate an initial angle α, which is a timing where the positive pulse is first generated, based on a following mathematical formula (7), and
generate the positive pulse and the negative pulse alternately based on the pulse width θa, the initial angle α, and the interval β, $$\theta a = 2 \arcsin(E\pi/4Ed) \quad (5)$$

$$\beta = \pi - \theta a \quad (6)$$

$$\alpha = -\Phi + \beta/2 \quad (7)$$

where Ed represents a value of the direct current voltage.

10. The electric power receiving device according to claim 1, wherein a capacitance of the capacitor is set in such a manner that a resonant frequency with the secondary coil is lower than a frequency of the second alternating current.

11. The electric power receiving device according to claim 1, further comprising:
a voltage converting section that converts the second alternating voltage into a direct current voltage.

12. A method of receiving an electric power from a primary coil with which a first alternating voltage is applied and through which a first alternating current flows, the method comprising:
generating a second alternating voltage based upon the first alternating current in a series resonance circuit that comprises a secondary coil electromagnetically-coupled to the primary coil and a capacitor connected to the secondary coil in series;
generating a reducing-voltage, the reducing-voltage being capable of reducing a reactance voltage generated in the series resonance circuit by a second alternating current generated in the series resonance circuit, due to the second alternating voltage, and the reducing-voltage being equal to the second alternating voltage in frequency; and
applying the reducing-voltage to the series resonance circuit.

* * * * *